(12) United States Patent
Hohler et al.

(10) Patent No.: US 11,185,190 B2
(45) Date of Patent: Nov. 30, 2021

(54) CLEATED CONTINUOUS CONVEYOR FRYER AND ASSOCIATED SYSTEMS

(71) Applicant: Henny Penny Corporation, Eaton, OH (US)

(72) Inventors: Melissa M. Hohler, Kettering, OH (US); Thomas M. Smith, Eaton, OH (US); Steven V. Ricca, Upper Arlington, OH (US)

(73) Assignee: Henny Penny Corporation, Eaton, OH (US)

( * ) Notice: Subject to any disclaimer, the term of this patent is extended or adjusted under 35 U.S.C. 154(b) by 195 days.

(21) Appl. No.: 16/466,354

(22) PCT Filed: Dec. 14, 2017

(86) PCT No.: PCT/US2017/066322
§ 371 (c)(1),
(2) Date: Jun. 4, 2019

(87) PCT Pub. No.: WO2018/112152
PCT Pub. Date: Jun. 21, 2018

(65) Prior Publication Data
US 2020/0060475 A1 Feb. 27, 2020

Related U.S. Application Data

(60) Provisional application No. 62/462,155, filed on Feb. 22, 2017, provisional application No. 62/434,793, filed on Dec. 15, 2016.

(51) Int. Cl.
*A47J 37/12* (2006.01)
*A23L 5/10* (2016.01)
(Continued)

(52) U.S. Cl.
CPC .............. *A47J 37/1214* (2013.01); *A23L 5/11* (2016.08); *A47J 37/1228* (2013.01);
(Continued)

(58) Field of Classification Search
CPC ................. A47J 37/1214; A47J 37/1223; A47J 37/1228; A47J 37/1257; A47J 37/1276;
(Continued)

(56) References Cited

U.S. PATENT DOCUMENTS 2,319,561 A * 5/1943 Scharsch ............. A47J 37/1214
99/404
2,546,163 A 3/1951 McBeth
(Continued)

FOREIGN PATENT DOCUMENTS

EP 1240861 A1 9/2002
GB 694947 A * 7/1953 .......... A47J 37/1214
(Continued)

OTHER PUBLICATIONS

International Searching Authority, Search Report and Written Opinion issued in International Application No. PCT/US17/066322 dated Feb. 23, 2018, 10 pages.
(Continued)

*Primary Examiner* — Drew E Becker
*Assistant Examiner* — Austin Parker Taylor
(74) *Attorney, Agent, or Firm* — Wood Herron & Evans LLP

(57) ABSTRACT

A fryer includes a cooking chamber for holding a cooking medium and at least one heating element positioned within the cooking chamber. The fryer further includes a conveyor belt for selectively advancing food product through the cooking chamber. The conveyor belt includes first and second chains coupled together by a plurality of elongate members extending therebetween. The conveyor belt further
(Continued)

includes a plurality of paddles coupled to the first and second chains and extending therebetween to define a plurality of compartments. Each of the plurality of paddles includes a screen, and each compartment is sized to receive at least a portion of the food product. The conveyor belt defines a continuous loop.

17 Claims, 8 Drawing Sheets

(51) Int. Cl.
  *F25B 29/00* (2006.01)
  *B65G 17/46* (2006.01)
  *B65G 17/06* (2006.01)
(52) U.S. Cl.
  CPC ........ *A47J 37/1266* (2013.01); *B65G 17/063* (2013.01); *B65G 17/46* (2013.01); *F25B 29/00* (2013.01)
(58) Field of Classification Search
  CPC .. A47J 27/10; A47J 36/20; A47J 36/22; A47J 36/2405; A47J 37/12–1295; A23L 5/11; A21B 5/08; B65G 17/46; B65G 17/06; B65G 17/063; B65G 17/083; B65G 15/52
  USPC ........................................ 99/404–406, 443 C
  See application file for complete search history.

(56) References Cited

U.S. PATENT DOCUMENTS

| | | | |
|---|---|---|---|
| 2,853,937 A | | 9/1958 | Peck |
| 2,917,008 A | * | 12/1959 | Kipnis .................... A21C 11/16 99/353 |
| 2,984,336 A | * | 5/1961 | Frost, Jr. ................ B65G 47/19 198/536 |
| 3,181,734 A | | 5/1965 | Ensign |
| 3,611,984 A | | 10/1971 | Angold |
| 3,761,290 A | | 9/1973 | Brunner |
| 3,785,273 A | * | 1/1974 | Stickle .................... A21B 5/08 99/404 |
| 3,861,289 A | * | 1/1975 | Baker .................. A47J 37/1214 99/404 |
| 3,885,056 A | | 5/1975 | Smith et al. |
| 3,900,580 A | * | 8/1975 | Boggs .................. A47J 37/1233 426/417 |
| 4,228,730 A | * | 10/1980 | Schindler ............ A47J 37/1214 126/391.1 |
| 4,488,478 A | | 12/1984 | Leeper |
| 5,085,137 A | * | 2/1992 | Mottur ................. A47J 37/1214 99/330 |
| 5,603,973 A | | 2/1997 | Benson et al. |
| 5,655,647 A | * | 8/1997 | Wheeler ................. B65G 21/00 198/861.5 |
| 6,234,972 B1 | | 5/2001 | Lia et al. |
| 6,843,166 B1 | | 1/2005 | Li |
| 7,174,830 B1 | | 2/2007 | Dong |
| 7,478,749 B2 | | 1/2009 | Clothier et al. |
| 7,824,721 B2 | | 11/2010 | Sus et al. |
| 8,464,635 B1 | * | 6/2013 | Sprinkle ............. A47J 37/1214 99/404 |
| 2002/0025365 A1 | | 2/2002 | DeFrancisci et al. |
| 2003/0205027 A1 | | 11/2003 | Sus et al. |
| 2006/0075904 A1 | | 4/2006 | Vadevoulis et al. |
| 2010/0206179 A1 | * | 8/2010 | Foster ................. A47J 37/1204 99/407 |
| 2014/0272050 A1 | * | 9/2014 | Shelemey ........... A47J 37/1214 426/438 |
| 2014/0356496 A1 | | 12/2014 | Melnyczuk |

FOREIGN PATENT DOCUMENTS

| | | | |
|---|---|---|---|
| GB | 694947 A | | 7/1953 |
| GB | 2098464 A | * | 11/1982 ............... A21B 5/08 |
| JP | 2010094295 A | * | 4/2010 .......... A47J 37/1214 |
| WO | 2008141393 A2 | | 11/2008 |

OTHER PUBLICATIONS

European Patent Office, Extended Search Report issued in European Application No. 17880895.2 dated May 6, 2020 (completed May 26, 2020), 7 pages.

* cited by examiner

CLEATED CONTINUOUS CONVEYOR FRYER AND ASSOCIATED SYSTEMS

CROSS REFERENCE TO RELATED APPLICATIONS

This application is a national phase application of, and claims priority to, International Patent Application No. PCT/US2017/066322, filed on Dec. 14, 2017, which claims the benefit of U.S. Provisional Patent Application Ser. No. 62/462,155, filed Feb. 22, 2017, and U.S. Provisional Patent Application Ser. No. 62/434,793, filed Dec. 15, 2016, the disclosures of which are incorporated by reference herein in their entireties.

TECHNICAL FIELD

This application relates generally to food product cooking systems and methods. More specifically, this application describes mechanisms and methods for adding space and time efficiencies in food production environments such as restaurants.

BACKGROUND

Cooking devices, such as fryers, are used to cook various food products, e.g., poultry, fish, potato products, and the like. Such cooking devices may include one or more cooking chambers, e.g., fryer pots or vats, which may be filled with a cooking medium, e.g., an oil, a liquid shortening, or a meltable-solid shortening. Such cooking apparatus also may include a heating element, e.g., an electrical heating element, such as a heating coil, or a gas heating element, such as a gas burner and gas conveying tubes, which heats the cooking medium in the cooking chamber. After the cooking medium reaches a preset cooking temperature, the food products are placed into the cooking medium such that the food products are cooked in the cooking medium. For example, the food products may be positioned inside a container, e.g., a wire basket, and submerged in the cooking medium for a predetermined amount of time sufficient to cook the food products.

Restaurants strive to increase production in order to satisfy customer demand One way to increase production is to utilize a high volume fryer, such as by replacing a restaurant's pre-existing traditional open fryer with a high volume fryer. However, high volume fryers are typically relatively large, and restaurants must operate within the space constraints imposed by the buildings which they occupy. As a result, restaurant equipment, including fryers, must be sized to fit within certain parameters. For example, kitchen layouts may allow a particular amount of space for a fryer and may be unable to accommodate fryers having footprints greater than that space. Some restaurants may allow a footprint of only approximately 92 inches by approximately 30 inches for a fryer and associated freezer and preparation or holding area. Of this footprint, a traditional open fryer may only occupy approximately 42 inches by 30 inches, in one example. The space allotted to the fryer may also be vertically bounded by a corresponding hood, such as an exhaust or vent hood, positioned thereover. However, a high volume fryer of a conventional design may require significantly more space than this. Many restaurants would be required to undergo substantial building renovations, replace previously installed hoods, and/or sacrifice space intended for other uses in order to reap the benefits of high volume fryers. Those reconfigurations are highly disfavored, and sometimes impossible.

Thus, it would be desirable to provide systems and methods to cook food product in a more efficient manner, specifically with regard to time and space considerations.

SUMMARY

In one embodiment, a fryer includes a cooking chamber for holding a cooking medium and at least one heating element positioned within the cooking chamber. The fryer further includes a conveyor belt for selectively advancing food product through the cooking chamber. The conveyor belt includes first and second chains coupled together by a plurality of elongate members extending therebetween. The conveyor belt further includes a plurality of paddles coupled to the first and second chains and extending therebetween to define a plurality of compartments. Each of the plurality of paddles includes a screen, and each compartment is sized to receive at least a portion of the food product. The conveyor belt defines a continuous loop.

In another embodiment, an automated cooking system includes a freezer having a dispensing mechanism for dispensing food product. The automated cooking system further includes a fryer having a cooking chamber for holding a cooking medium and at least one heating element positioned within the cooking chamber. The fryer further includes a conveyor belt for selectively advancing food product through the cooking chamber. The conveyor belt includes first and second chains coupled together by a plurality of elongate members extending therebetween. The conveyor belt further includes a plurality of paddles coupled to the first and second chains and extending therebetween to define a plurality of compartments. Each of the plurality of paddles includes a screen, and each compartment is sized to receive at least a portion of the food product. The conveyor belt defines a continuous loop. The automated cooking system further includes a hopper for receiving food product from the conveyor belt.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
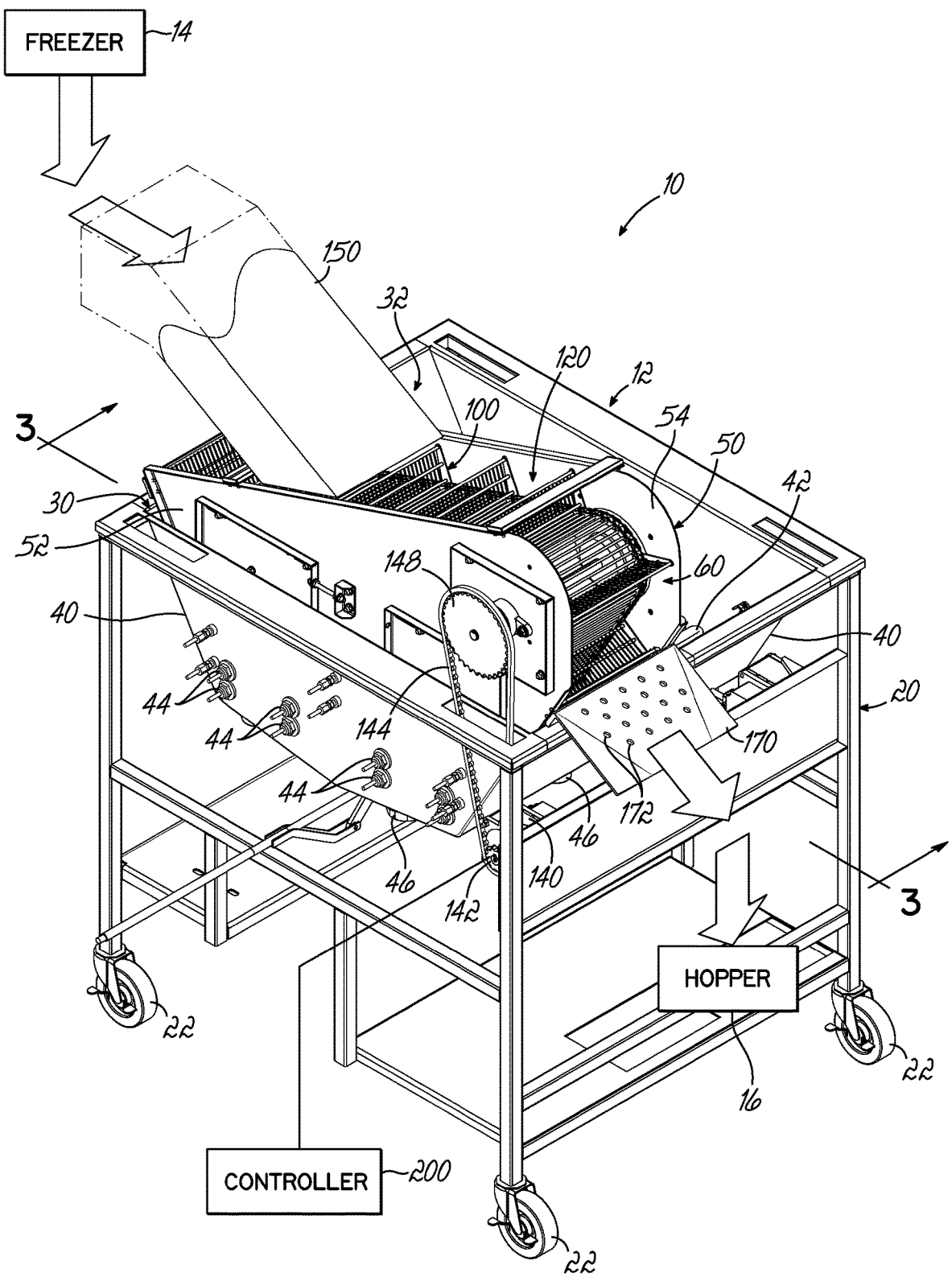
FIG. 1 is a perspective view of an exemplary automated cooking system in accordance with one embodiment of the invention.
Figure 2:
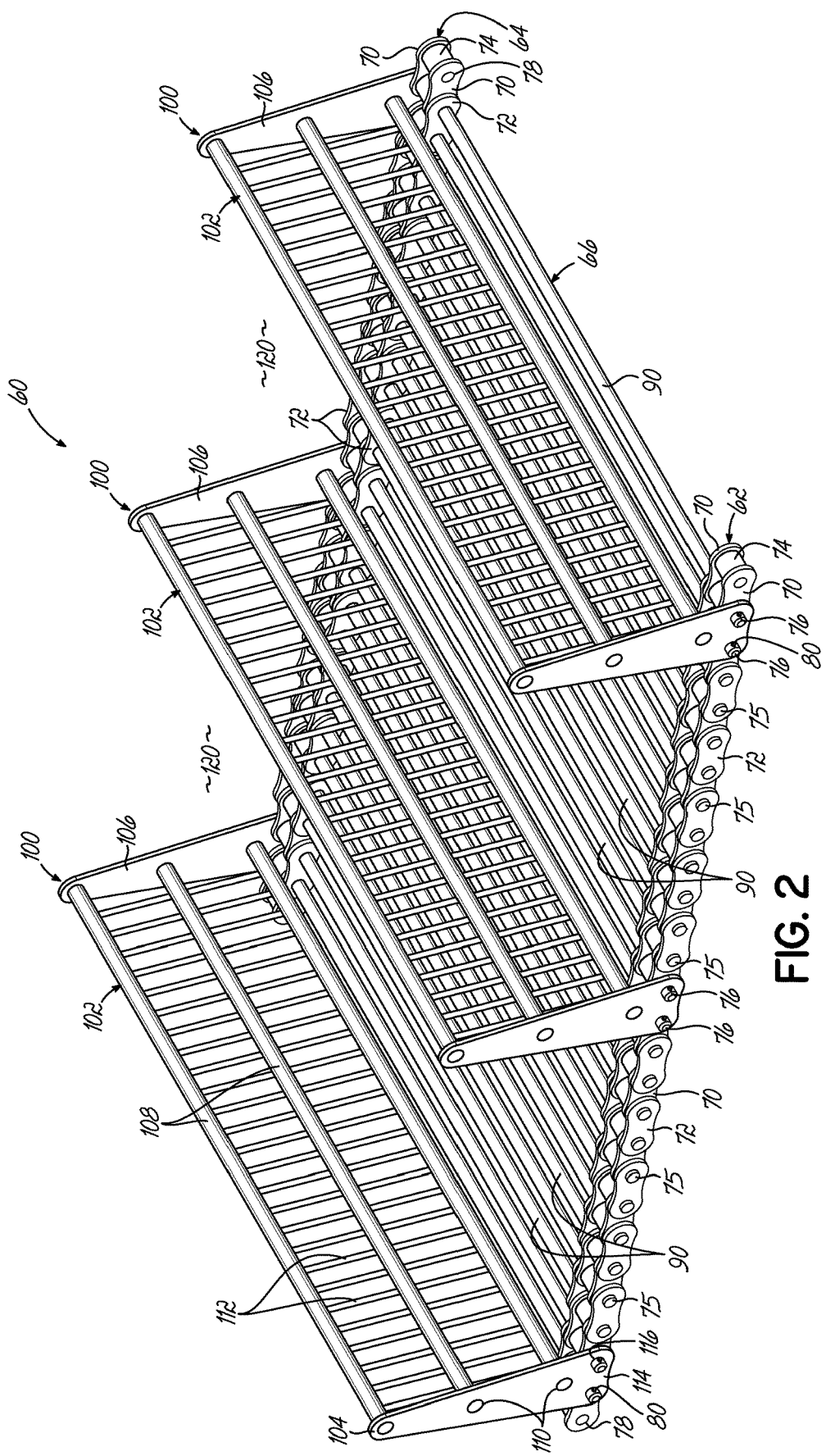
FIG. 2 is a perspective view of a portion of the conveyor belt shown in FIG. 1.
Figure 3:
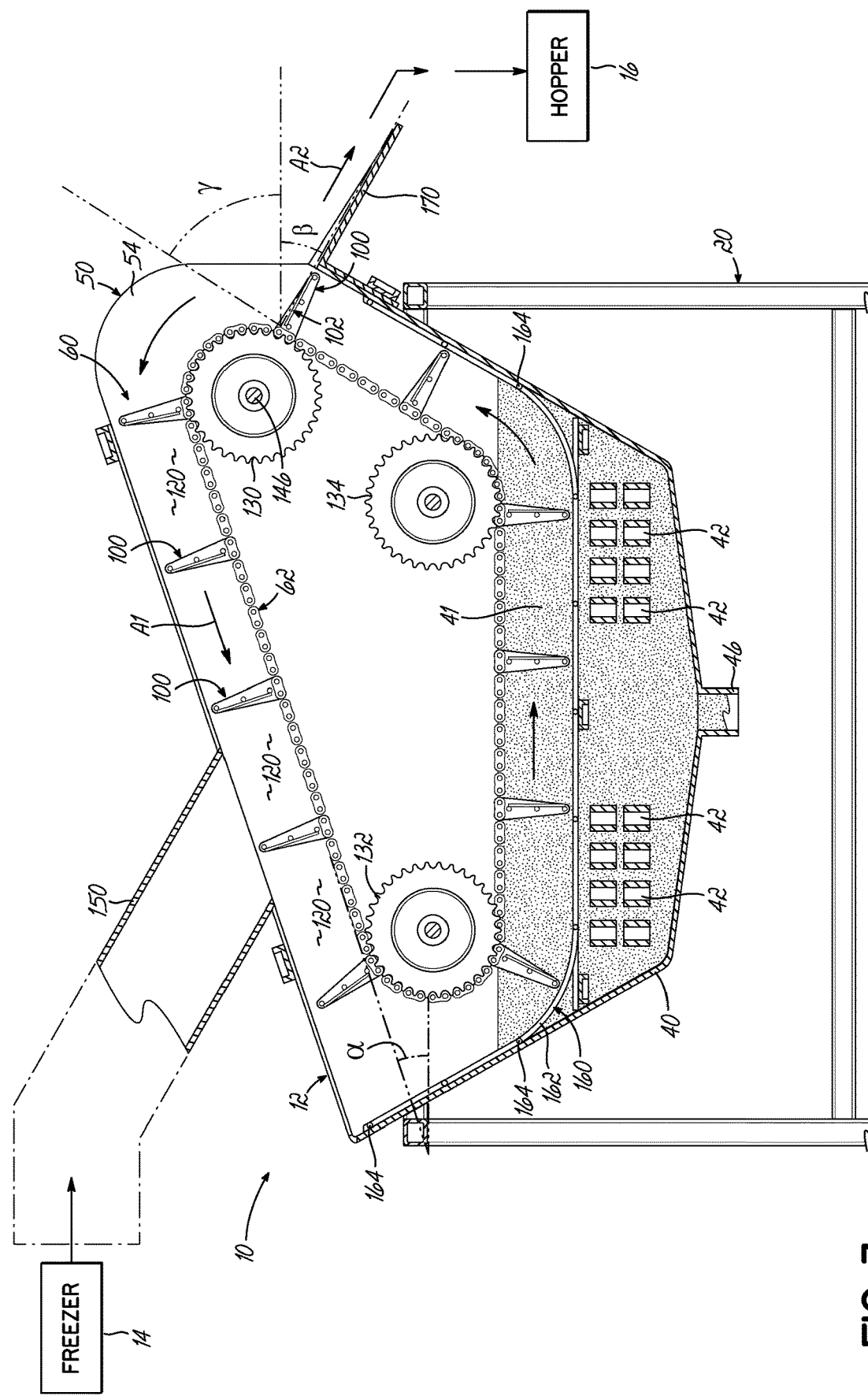
FIG. 3 is a partial cross sectional side view of the exemplary fryer shown in FIG. 1, taken along line 3-3 in FIG. 1, and showing the movement path of the conveyor belt.

With reference to FIGS. 1-3, an automated cooking system 10 including an automated cooking apparatus such as a fryer 12 is shown in accordance with one embodiment. As set forth in further detail below, the system 10 and/or fryer 12 provide improved efficiency in cooking operations. For example, the system 10 and/or fryer 12 are capable of cooking a high volume of food products in a relatively small space. In one embodiment, the system 10 may cook at least approximately one and a half times the amount of food as a traditional open fryer while occupying the same floor space. For example, the system 10 may cook up to 250 pounds of waffle fries per hour or more. The features of the system 10 and fryer 12 are set forth in further detail below to clarify each of these functional advantages and other benefits provided in this disclosure.

As shown in FIG. 1, the system 10 includes the fryer 12, a freezer 14, and a hopper 16 such as a heated holding cabinet or prep table. The freezer 14 and hopper 16 are of a conventional design, and thus are not shown in detail in the figures. Food product such as, for example, waffle fries, are dispensed into the fryer 12 from the freezer 14, cooked in the fryer 12, and then dispensed from the fryer 12 to the hopper 16, as discussed in greater detail below.

The fryer 12 includes a frame 20 mounted on a plurality of wheels 22 so that the fryer 12 may be easily moveable on a surface such as a floor. In one embodiment, one or more of the wheels 22 may be lockable to prevent unwanted movement of the fryer 12 during operation. Alternatively, the wheels 22 may be eliminated. Though not shown, it will be appreciated that various fryer components such as, for example, oil filtration and recirculation components, may be supported by and/or housed by the frame 20. In addition or alternatively, wall panels and/or doors may be provided on the frame 20 to cover various interior portions of the frame 20.

The frame 20 defines first and second fryer stations 30, 32. Each station 30, 32 includes a cooking chamber or oil vat 40 for holding oil 41 or any other suitable cooking medium (FIG. 3). A number of heating elements 42 are positioned in at least a lower portion of each oil vat 40 for heating the oil 41 so as to cook food products submerged therein. In the embodiment shown, eight heating elements 42 are positioned in each oil vat 40 in groups of four (FIG. 3). However, each oil vat 40 may include any number of heating elements 42 in any arrangement, as may be desired. Heating element couplings 44 are provided on an exterior of the oil vats 40 for selectively supplying electricity or heated gas to the heating elements 42. Sumps 46 are provided at lowermost portions of the oil vats 40 to allow oil drainage therefrom. The first and second fryer stations 30, 32, and thus the respective oil vats 40, may be separated from each other by a wall (not shown), such that cooking operations within the first and second fryer stations 30, 32 may be independent of each other. In one embodiment, each oil vat 40 may hold approximately 30 pounds of oil such that the fryer 12 may have a total capacity of approximately 60 pounds of oil.

As shown, a fryer manifold 50 is positioned in the first fryer station 30 over the respective oil vat 40. The fryer manifold 50 includes first and second side walls 52, 54 and houses a conveyor belt 60 for selectively advancing food product through the oil vat 40. Only one fryer manifold 50 is shown in FIG. 1 for the sake of simplicity.

Referring now to FIG. 2, and with continued reference to FIG. 1, the conveyor belt 60 includes first and second chains 62, 64 arranged and coupled together to form a chain ladder 66. More particularly, each of the chains 62, 64 is a roller chain and includes a series of inner links 70, outer links 72, rollers 74, and pins 75, 76, and each of the inner and outer links 70, 72 includes two apertures 78 sized and spaced apart to receive the pins 75, 76, as is known. The pins 75 may be secured within the apertures via a friction fit, and the pins 76 may be secured within the apertures via a spring clip 80. As shown, the first and second chains 62, 64 are coupled to each other by a number of elongate members 90 extending therebetween. In this regard, the distal ends of the elongate members 90 may comprise the pins 75, 76 of the first and/or second chains 62, 64. The first and second chains 62, 64 are spaced apart by the elongate members 90 to define a width of the conveyor belt 60, which is substantially equal to or slightly less than the distance between the first and second sidewalls 52, 54 of the fryer manifold 50. The elongate members 90 are spaced apart from each other (e.g., by virtue of the spacing of the apertures 78) to allow the passage of oil therebetween while inhibiting the passage of food product therebetween. For example, the elongate members 90 may be spaced apart by a distance of between approximately 0.25 inch and approximately 0.63 inch. The elongate members 90 are constructed of a material having sufficient strength and durability to support food product carried on the chain ladder 66 and to suppress buoyant food below the chain ladder 66 during movement through the oil 41. For example, the elongate members 90 may be metal rods having a diameter of between approximately 0.125 inch and approximately 0.250 inch.

As shown, the conveyor belt 60 further includes a number of cleats or paddles 100 coupled to the first and second chains 62, 64 and extending therebetween. Each paddle 100 includes a screen 102 coupled to each of the chains 62, 64 by first and second brackets 104, 106. The screens 102 each include a number of elongate members 108 extending between the first and second brackets 104, 106. To that end, each bracket 104, 106 includes apertures 110 for receiving distal ends of the elongate members 108. Each screen 102 further includes a number of elongate cross-members 112 extending between the uppermost and lowermost of the elongate members 108 and generally perpendicular thereto such that each screen 102 has a generally webbed configuration. The elongate members 108 and/or cross-members 112 of the screen 102 may be generally similar to the elongate members 90 of the chain ladder 66. For example, the elongate members 108 and/or cross-members 112 are spaced apart to allow the free passage of oil therebetween to flow through the paddles 100, and are constructed of a material having sufficient strength and durability to support food product carried on the paddle 100 and to push food product downstream of the paddle 100. For example, the elongate members 108 may be metal wires having a diameter of between approximately 0.125 inch and approximately 0.250 inch. In addition or alternatively, the elongate cross-members 112 may be metal wires having a diameter of between approximately 0.030 inch and approximately 0.125 inch.

In the embodiment shown, the first and second brackets 104, 106 are attached to the first and second chains 62, 64, respectively. In particular, each of the brackets 104, 106 includes a lower portion 114 sized and shaped to resemble an outer link 72 of either chain 62, 64. For example, the lower portions 114 each include two apertures 116 similar to the apertures 78 of the inner and outer links 70, 72, in that they are sized and spaced apart to receive the pins 76. In this manner, the lower portion 114 of each bracket 104, 106 may replace an outer link 72 of the first or second chain 62, 64 without disrupting the structure and/or function of the chain 62, 64. Stated another way, each bracket 104, 106 includes and/or is integrally formed with an outer link 72 of the first or second chain 62, 64. In one embodiment, the brackets 104, 106 may be laser-cut to incorporate the features of an outer link 72. In any event, the conveyor belt 60 may be assembled by removing outer links 72 of the first and second chains 62, 64 at predetermined corresponding increments and replacing the removed outer links 72 with the lower portions 114 of the brackets 104, 106 to thereby couple the paddles 100 to the chains 62, 64. The spring clips 80 may assist in allowing the removal of these outer links 72 and/or may assist in retaining the brackets 104, 106 on the respective chains 62, 64. In the embodiment shown, adjacent brackets 104, 106 are spaced apart from each other along each chain 62, 64 by five outer links 72 to achieve a desired spacing between adjacent paddles 100, as discussed in greater detail below. It will also be appreciated that the brackets 104, 106 could replace inner links 70 in other embodiments without departing from the scope of the invention.

As shown, each paddle 100, and more particularly each screen 102, is substantially perpendicular to the chain ladder 66. In this regard, the elongate members 108 and/or elongate cross-members 112 reside in a plane(s) substantially perpendicular to the chains 62, 64. Thus, when the chains 62, 64 are substantially horizontal the paddles 100 may be substantially vertical, and when the chains 62, 64 are substantially vertical the paddles 100 may be substantially horizontal. Therefore, food product carried by the conveyor belt 60 may be supported by the elongate members 90 of the chain ladder 66 and/or by the screens 102 of the paddles 100 depending on the particular orientation of the chains 62, 64.

As shown, the paddles 100 extend substantially the entire width of the conveyor belt 60 and are spaced apart from each other to define a number of discrete compartments 120, each of which is sized to receive at least a portion of food product. More particularly, each compartment 120 is defined by a forward paddle 100, a rearward paddle 100, and the elongate members 90 defining the conveyor belt 60 therebetween. Since the conveyor belt 60 makes a continuous loop (FIG. 3), each paddle 100 may serve both as a rearward paddle 100 of a first compartment 120 and as a forward paddle 100 of a second compartment 120 upstream of the first compartment 120. The paddles 100 are adequately spaced apart such that at every position along the loop, food product contained in a particular compartment 120 is kept separated from the adjacent compartments 120. In the embodiment shown, this is achieved by spacing adjacent brackets 104, 106 apart by five outer links 72. However, the desired spacing may vary depending upon a number of factors, such as the configuration of the loop, the size of the inner and outer links 70, 72, and the heights of the paddles 100. Eleven paddles 100 are provided on the illustrated conveyor belt 60 to define eleven compartments 120. However, any number of paddles 100 and/or compartments 120 may be provided as may be desired.

The conveyor belt 60 is positioned over a number of belt sprocket gears in a continuous loop within the fryer manifold 50 (FIG. 3). More particularly, each chain 62, 64 of the chain ladder 66 is positioned over a driven belt sprocket gear 130 and first and second idler sprocket gears 132, 134 which engage with the chains 62, 64 such that rotating the driven belt sprocket gear 130 drives the conveyor belt 60 along a movement path, as discussed in further detail below. It will be appreciated that the illustrated arrangement of sprocket gears 130, 132, 134 is exemplary only and various other arrangements may be used. For example, the locations of the one of the driven belt sprocket gears 130 and one of the idler sprocket gears 132, 134 may be switched. In addition or alternatively, one driven belt sprocket gear 130 may be replaced with another idler sprocket gear such that only one of the chains 62, 64 may be positioned over a driven belt sprocket gear 130.

Referring again specifically to FIG. 1, a motor 140 is mounted to the frame 20 for supplying rotary motion to drive the conveyor belt 60. In particular, the motor 140 includes a motor sprocket gear 142 which rotates when the motor 140 is activated. The motor sprocket gear 142, in turn, engages with a belt drive chain 144 operably coupled to a driven shaft 146 (FIG. 3). To that end, the driven shaft 146 is coupled to a driven shaft sprocket gear 148 on an exterior side of the manifold 50 and to the driven belt sprocket gear(s) 130 on an interior side of the manifold 50. The driven shaft sprocket gear 148 engages with the belt drive chain 144 to transmit the motion from the motor 140 and/or motor sprocket gear 142 to the driven shaft 146 and thereby to the driven belt sprocket gear(s) 130 to drive the conveyor belt 60. In the embodiment shown, counterclockwise rotation of the motor sprocket gear 142 causes movement of the conveyor belt 60 in a generally counterclockwise direction. As shown, the driven shaft sprocket gear 148 is substantially larger in diameter than the motor sprocket gear 142 such that the rotation of the driven shaft 146 is slower than the rotation of the motor sprocket gear 142 in order to provide a relatively slow movement of the conveyor belt 60. In addition or alternatively, the motor 140 may operate with a relatively low output rate. It will be appreciated that the output rate of the motor 140 and/or the relative sizes of the motor sprocket gear 142 and driven shaft sprocket gear 148 correspond to the speed of the conveyor belt 60, which impacts the cooking time of food product in the oil vat 40. Thus, these factors may be varied depending on a desired cooking time.

With specific reference now to FIG. 3, the movement path of the conveyor belt 60, and thus the paddles 100 and respective compartments 120, is illustrated by the arrows A1. While various directional terms such as "left" and "right" are used herein to describe this path, these terms are used only with respect to the exemplary frame of reference shown in FIG. 3 and are not intended to be limiting. In the embodiment shown, each chain 62, 64 is positioned over a total of three sprocket gears 130, 132, 134 such that the loop formed by the conveyor belt 60, and thus the movement path, is generally triangular. As such, the movement path may be generally defined by first, second, and third legs. In all three legs, the first and second sidewalls 52, 54 of the fryer manifold 50 provide side barriers to prevent food product within a compartment 120 from escaping and falling out of the fryer 12 at unintended locations.

Initially in the first leg, each compartment 120 moves at an incline in a generally downward and leftward manner to a position substantially below a loading chute 150, where the compartment 120 may receive food product dispensed from the freezer 14. As shown, the incline of the first leg is relatively gentle such that any food product received in the compartment 120 may be primarily supported by the elongate members 90 of the chain ladder 66 and carried thereon in the direction of the movement path. For example, this incline may be defined by an angle α of between approximately 10 degrees and approximately 40 degrees with respect to horizontal. In the embodiment shown, the first leg is substantially entirely above the oil 41.

As the compartment 120 reaches the end of the first leg, the forward paddle 100 of the compartment 120 rotates about the first idler sprocket gears 132 into the oil 41 and any food product in the compartment 120 is dropped or otherwise lowered into the oil 41, where it may begin to cook. Likewise, the rearward paddle 100 of the compartment 120 subsequently rotates about the first idler sprocket gears 132 and, by virtue of its substantial perpendicularity to the chains 62, 64, may simultaneously suppress any food product having a buoyancy great enough to resist submersion into the oil 41. In addition or alternatively, the substantial perpendicularity of the rearward paddle 100 to the chains 62, 64 may prevent any food product contained in the adjacent upstream compartment 120 from prematurely dropping into the oil 41 and intermingling with the food product of the present compartment 120. In other words, as the compartment 120 transitions from the first leg to the second leg, the paddles 100 continuously maintain the separation of food products in the various compartments 120.

As each paddle transitions into the second leg, it travels over a track 160 provided in the oil vat 40 to limit the space in which the food product may flow. The track 160 may have a webbed configuration similar to the screens 102 of the paddles 100 such that oil may freely pass therethrough while food product may not. At least a portion of the track 160 extends between the conveyor belt 60 and the heating elements 42 to prevent food product from directly contacting the heating elements 42 and becoming scorched or burned thereby. As shown, this portion of the track 160 is substantially parallel to the chain ladder 66 and spaced apart therefrom by a distance slightly greater than a height of the paddles 100 to provide clearance for the paddles 100 while preventing food product in a particular compartment 120 from escaping to an adjacent compartment 120. In the second leg, each compartment 120 moves rightward in a generally horizontal manner over the track 160. The rearward paddle 100 pushes the food product contained in the compartment 120 along the movement path over the heating elements 42 and the elongate members 90 of the chain ladder 66 prevent any buoyant food product from floating out of the compartment 120 toward the surface of the oil 41. The track 160 is configured to promote movement of food product, such as sinking food product, along the movement path without unwanted snagging. In this regard, the track 160 includes a number of elongate members 162 (e.g., similar to the elongate members 90, 108) extending parallel to the movement direction, and a number of elongate cross-members 164 (e.g., similar to the elongate cross-members 112) generally perpendicular to the elongate members 162 and positioned between and/or on the underside of the elongate members 162 so as to avoid having joints of the members 162, 164 positioned to catch or snag food product or otherwise interfere with the passage of food product over and/or along the track 160.

As the compartment 120 reaches the end of the second leg, the forward paddle 100 rotates about the second idler sprocket gears 134 into the third leg wherein each compartment 120 moves at an incline in a generally upward and rightward manner toward an unloading ramp 170, where the compartment 120 may deposit cooked food product contained therein out to the hopper 16. As the compartment 120 transitions into the third leg, the food product is directed along the incline by a portion of the track 160 which, like the portion of the track 160 corresponding to the second leg, is substantially parallel to the chain ladder 66 and spaced apart therefrom by a distance slightly greater than the height of the paddles 100. As in the second leg, the rearward paddle 100 pushes the food product contained in the compartment 120 along the movement path until the rearward paddle 100 rotates about the second idler sprocket gears 134, whereat the rearward paddle 100 and, more particularly, the elongate cross-members 112 of the screen 102, carry the food product against the track 160 and out of the oil 41. As the food product exits the oil 41, any residual oil on the food product may drain back into the oil vat 40 by gravity. Similarly, when the rearward paddle 100 exits the oil, any residual oil may pass through the screen 102 to return to the oil vat 40. In one embodiment, the surface of the oil 41 and the unloading ramp may be spaced apart by approximately 1 inch, and approximately 20 seconds may elapse between food product emerging from the oil 41 and the rearward paddle 100 reaching the unloading ramp 170, in order to allow for adequate draining of residual oil.

When the rearward paddle 100 clears the oil vat 40 and reaches the unloading ramp 170, the screen 102 is angled with respect to horizontal to promote sliding of the food product along the paddle 100 and onto the unloading ramp 170 in the direction of the arrow A2. For example, the orientation of the screen 102 at this location on the loop may be defined by an angle β of between approximately 15 degrees and approximately 45 degrees with respect to horizontal. In the embodiment shown, this is achieved by defining the incline of the third leg by an angle γ of between approximately 45 degrees and approximately 75 degrees with respect to horizontal, in conjunction with the substantial perpendicularity of the screen 102 to the chains 62, 64. In addition or alternatively, the elongate cross-members 112 of the rearward paddle 100 may promote sliding of the food product as a result of their being oriented substantially parallel to the sliding direction A2. In this regard, the elongate members 108 of the screen 102, which are perpendicular to the sliding direction A2, are on undersides of the elongate cross-members 112 at this position on the loop so as to avoid having joints between the members 108 and cross-members 112 positioned in the flow path of food product, which could interfere with the sliding of the food product along the elongate cross-members 112. As shown, the unloading ramp 170 may be oriented at an angle similar to the screen 102 at this position to promote continued sliding of the food product along the unloading ramp 170 to the hopper 16. In one embodiment, the unloading ramp 170 may include perforations 172 (FIG. 1) to allow further drainage of any residual oil prior to the food product entering the hopper 16. Alternatively, the unloading ramp 170 may be eliminated and the food product may slide directly from the paddle 100 to the hopper 16. In any event, as the compartment 120 reaches the end of the third leg, the forward and rearward paddles 100 each rotate about the driven belt sprocket gears 130 such that after the food product exits the compartment 120, the compartment 120 transitions back to the first leg so that the cycle may repeat.

In the embodiment shown, cooking of the food product primarily occurs during the second leg of the movement path. However, some cooking may occur during the first and/or third legs, depending on, for example, the particular configuration of the loop and the location of the surface of the oil 41. In this regard, the conveyor belt 60 is advanced along the movement path via the motor 140 at a predetermined speed that corresponds to the required cook time of a particular food product in the oil 41. In one embodiment, a cooking operation in the fryer station 30 may allow cooking waffle fries at a rate of 125 pounds per hour in approximately the same footprint as a traditional open fryer such as, for example, in a horizontal area of approximately 42 inches by approximately 30 inches. It will be appreciated that the required cook time will vary depending on a number of factors such as the type of food product and the temperature of the oil 41. Therefore, a controller 200 (FIG. 1) may be operatively coupled to the motor 140 to allow a user to select a desired speed of the conveyor belt 60 for a particular cooking operation. In one embodiment, the movement speed remains constant such that each compartment 120 of food product is cooked in the oil 41 for the same desired set point cooking time. In addition or alternatively, the controller 200 may be operatively coupled to one or more of the heating elements 42 to allow a user to select a desired temperature of the oil 41.

In any event, the controller 200 may be operatively coupled to a dispensing mechanism of the freezer 14 to enable coordination between the dispensing of uncooked food product from the freezer 14 onto the conveyor belt 60 and the movement of the conveyor belt 60 via the motor 140, such that a predetermined amount of food product is dispensed into a particular compartment 120.

In one embodiment, the controller 200 may be configured to implement different modes of the system 10 and/or fryer 12. For example, in a first mode, continuous cooking operations in the fryer 12 may be performed by continuously dispensing food product into each successive compartment 120 as the conveyor belt 60 is driven. In other words, food product may be continuously delivered to the fryer 12 without interruption in order to provide a constant supply of cooked food product. For example, the controller 200 may be operatively coupled to the dispensing mechanism of the freezer 14 to control the food product dispensing such that food product is delivered into every compartment 120 while the conveyor belt 60 moves at a continuous speed. The speed may be determined by the cook time required to cook the food product and the distance each compartment 120 must travel from the point at which the food product contained therein enters the oil 41 to the point at which the food product exits the oil 41. In particular, the speed of the conveyor belt 60 may be determined by calculating the quotient of the inches of required travel divided by the seconds of required cook time. In one embodiment, the motor 140 may be operated using a variable speed control so that the speed of the conveyor belt 60 may be adjusted slightly, such as to increase the speed and thereby reduce cook time to achieve a more desirable cooked product quality. The first mode may be referred to as a continuous mode.

In a second mode, cooking operations may be performed in batches by only dispensing food product into compartments 120 on an as-needed basis while the conveyor belt 60 is driven. In other words, food product may be delivered to a compartment 120 at various time intervals. Unlike traditional open vat fryers which use baskets to fry food product, and which are inherently operated in batch modes wherein the basket and fry vat are committed and unavailable for another basket once the basket is placed in the vat until the fryer completes the cook cycle, it is not necessary to wait a full cook cycle before adding food product to the vat 40. Instead, food product may be delivered to the next desired compartment 120. For example, the controller 200 may control the dispensing of food product from the freezer 14 so that food product is delivered to every second compartment 120, every third compartment 120, or on-demand. In such cases, the conveyor belt 60 may move at a continuous mode speed similar to that discussed above with respect to the first mode. Thus, the primary distinction between the first and second modes is the product delivery rate to the fryer 12. The second mode may be referred to as a hybrid continuous/batch mode.

In a third mode, cooking operations may be performed in batches while adjusting the speed of the conveyor belt 60 to mimic a traditional basket-type batch mode. In other words, food product may be dispensed from the freezer 14 into compartments 120 at varying dispense rates and with varying speeds of the conveyor belt 60. For example, initial food product may be dispensed into a first compartment 120, and the conveyor belt 60 may be rapidly indexed to position a second compartment 120 for receiving subsequent food product, with neither compartment 120 being submerged in the oil 41 yet. The subsequent food product may then be dispensed into the second compartment 120 and the conveyor belt 60 may be rapidly indexed to submerge both compartments 120 into the oil 41, at which point the movement of the conveyor belt 60 may be halted. The food product may then be cooked in the oil 41 for the desired amount of time while the conveyor belt 60 remains stationary. At the end of the cook cycle, the conveyor belt 60 may be rapidly indexed to eject the cooked food product to the hopper 16. Thus, in the third mode, the compartments 120 are committed similar to traditional submerged baskets. The third mode may be referred to as a batch mode.

In addition or alternatively, the conveyor belt 60 may be kept stationary in a standby mode when no food product is being dispensed from the freezer 14 and the compartments 120 are empty.

It will be appreciated that operating the conveyor belt 60 at a continuous speed as in the first and second modes discussed above may provide increased flexibility by allowing food product to be dispensed on demand, continuously, or at certain increments. Such a configuration may also allow food product to be added at any time without waiting for a previous cook cycle to complete. As a result, cooked food product delivery can be ramped up or down with subsequence dispenses and without the substantial wait-time associated with traditional basket-based open vat fryers.

The controller 200 may include various other features for improving efficiencies of the system 10. In one embodiment, the controller 200 may be configured to alternate activation of the heating elements 42 in a particular oil vat 40 via the heating element couplings 44. In this regard, the controller 200 may selectively activate a portion of the heating elements 42 (e.g., one heating element 42) of a group in the oil vat 40 while leaving the remaining portion (e.g., three heating elements 42) of the group inactive. After allowing the activated portion to remain active for a predetermined/optimal time, the controller 200 may deactivate this portion and selectively activate a portion of the remaining heating elements 42. By alternating activation of the heating elements 42, the inactive or deactivated heating elements 42 may be conserved thereby increasing the usable life of the heating elements 42 and associated heating element couplings 44. The controller 200 may perform this selective activation, for example, during periods of low product demand. In addition or alternatively, the controller 200 may be configured to respond to a failure of an active heating element 42 by deactivating the failing heating element 42 and/or activating an inactive heating element 42 to avoid unwanted downtime.

In one embodiment, the controller 200 may be configured to provide improved site power management by monitoring and/or managing the power usage of the fryer 12 and freezer 14. For example, the controller 200 may deactivate and/or decrease the power consumption of one or more heating elements 42 during periods when the freezer 14 may require an increase in power consumption, such as for performing a cooling cycle of the freezer 14. In another embodiment, the controller 200 may be configured to perform predictive equipment health monitoring to provide information relating to the status of various components of the system 10 such as, for example, partial or full burnout of heating elements 42, failure of heating element couplings 44, and performance status of the conveyor belt 60.

While one fryer manifold 50 is shown in the first fryer station 30, it will be appreciated that a second fryer manifold 50 may be positioned in the second fryer station 32 such that independent cooking operations may be conducted in both fryer stations 30, 32. In one embodiment, simultaneous cooking operations in both fryer stations 30, 32 may cook at least approximately one and a half times the amount of food as a traditional open fryer while occupying substantially the same floor space. For example, such operations may allow cooking waffle fries at a rate of 250 pounds per hour in approximately the same footprint as a traditional open fryer such as, for example, in a horizontal area of approximately 42 inches by approximately 30 inches.

Thus, the system 10 and/or fryer 12 are capable of cooking a high volume of food products in a relatively small space. For example, the fryer 12 may be sized to fit in an area of a restaurant previously occupied by a traditional open fryer, and vented by a hood sized for the previous fryer. Therefore, the fryer 12 may be inserted into such a space without requiring the restaurant to undergo significant renovations, replace previously installed hoods, and/or sacrifice additional space. In this regard, the fryer 12 may be considered a "plug and play" fryer and may be easily incorporated into all types of existing kitchen and restaurant configurations, allowing the benefits of high volume cooking to be achieved by a wide variety of restaurant operators and their customers.

By dispensing uncooked food product from the freezer 14 onto the conveyor belt 60 of the fryer 12 and subsequently dispensing cooked food product from the conveyor belt 60 into the hopper 16, the system 10 provides for a substantially automated cooking of food product with little to no human intervention. In this regard, the fryer 12 may include a continuous oil filtration system to further decrease the amount of human intervention required to operate the system 10. In addition or alternatively, uncooked food product may be dispensed onto the conveyor belt 60 of the fryer 12 from a source other than the freezer 14 and/or by human placement of the food product into the fryer 12.

As described herein, various components of the fryer 12 such as the chains 62, 64, paddles 100, idler sprocket gears 132, 134, and track 160 are exposed to oil 41 during cooking operations. Therefore, any or all of these components may be constructed of a highly corrosion resistant material such as, for example 304 SST. In addition or alternatively, various covers and/or safety guards (not shown) may be positioned over at least a portion of the conveyor belt 60, belt drive chain 144, and/or other portions of the fryer 12. In one embodiment, a cover may be positioned over at least the top of the manifold 50 between the first and second walls 52, 54. Such a cover may include an opening at the loading chute 150 to allow food product to be dispensed from the loading chute 150 into the fryer 12.

Figure 4:
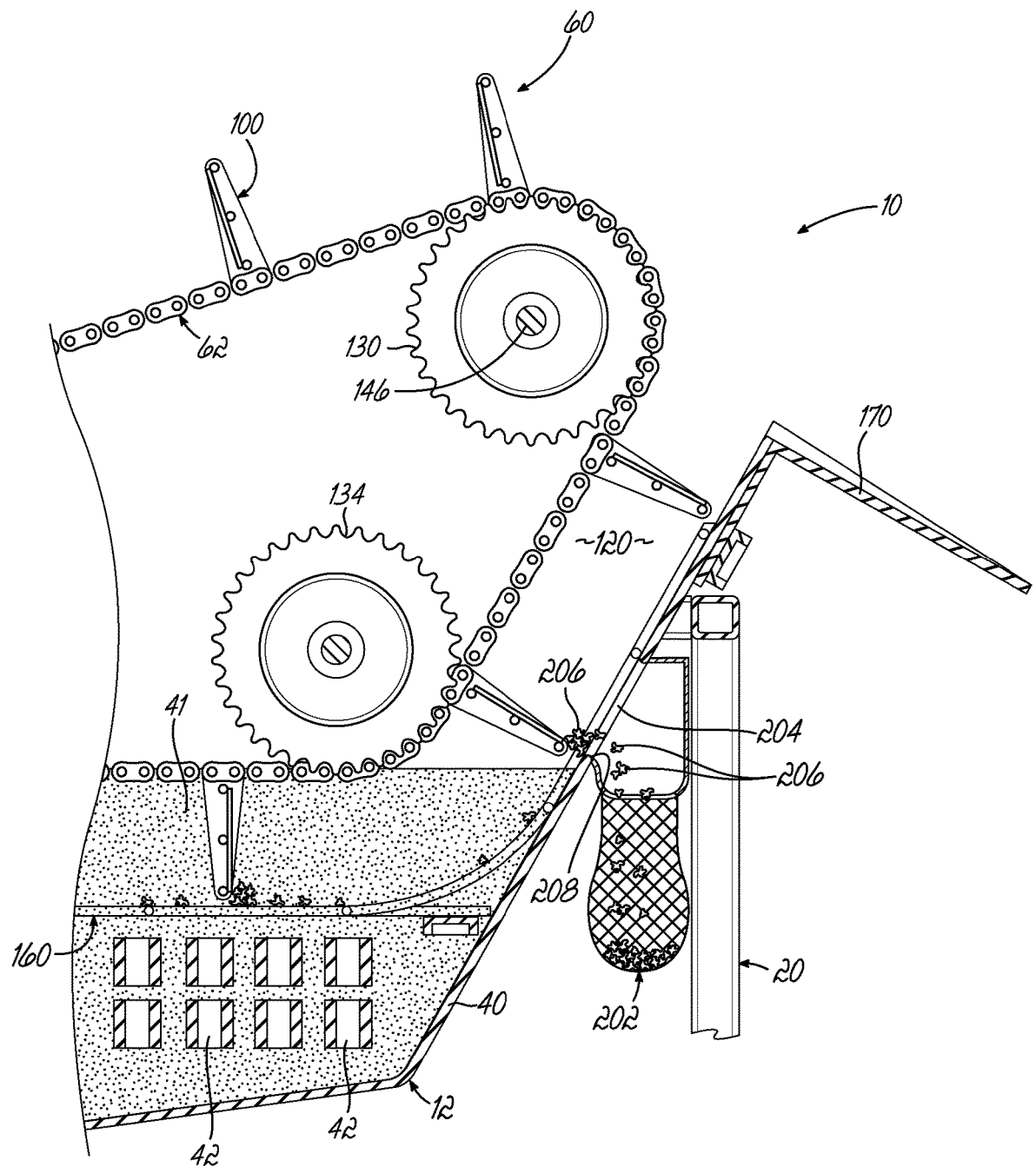
FIG. 4 is a detail view of the fryer shown in FIG. 1, showing the inclusion of a crumb trap in accordance with an embodiment of the invention.

Referring now to FIG. 4, a crumb trap 202 may be incorporated into the fryer 12 for capturing oil-borne debris in the oil vat 40. More particularly, the oil vat 40 may include an aperture 204 above the level of the oil 41 and upstream from the unloading ramp 170 for allowing debris such as crumbs 206 contained in each compartment 120 and small enough to pass through the webbed track 160 to enter the crumb trap 202. As shown, the lowermost edge of the aperture 204 may define a dam 208 for preventing oil 41 from passing therethrough, and the rearward paddle 100 of each compartment 120 may carry the crumbs 206 out of the oil 41 toward the dam 208. Each paddle 100 may deposit the crumbs 206 onto the dam 208, through the aperture 204, and into the crumb trap 202 in a manner generally similar to the depositing of the food product from the paddles 100 onto the unloading ramp 170 described above. In the embodiment shown, the webbed track 160 extends across the aperture 204 and thus prevents food product from passing therethrough into the crumb trap 202. In addition or alternatively, the aperture 204 may include a webbed structure for preventing food product from passing into the crumb trap 202. As shown, the crumb trap 202 may be of a wire-form configuration, and may be removable from the fryer 12 for disposal of the crumbs 206 contained therein. In addition or alternatively, the crumb trap 202 may be expandable to accommodate growing volumes of crumbs 206.

Figure 5:
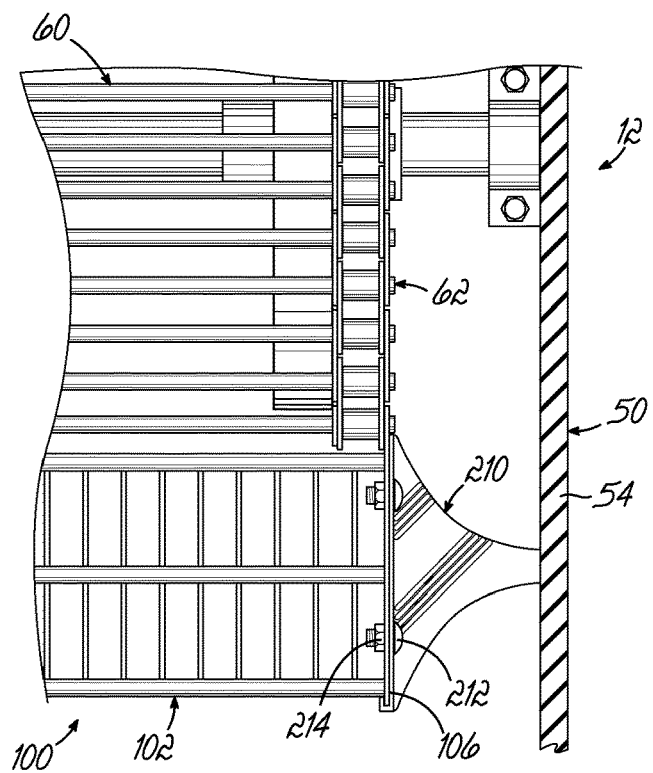
FIG. 5 is a detail view of the fryer shown in FIG. 1, showing the inclusion of a scraper in accordance with an embodiment of the invention.

Referring now to FIG. 5, one or more semi-flexible high temperature spatulas or scrapers 210 may be incorporated into the fryer 12 for inhibiting crumbs 206 and/or other debris from escaping a compartment 120 and traveling into the remainder of the oil vat 40. For example, a scraper 210 may be coupled to an outer side of each bracket 104, 106 of each paddle 100 on the conveyor belt 60 and extend outwardly therefrom, such as toward the corresponding sidewall 52, 54. The illustrated scraper 210 is coupled to the paddle 100 via bolts 212 and nuts 214. In addition or alternatively, each scraper 210 may include barbs molded therein for coupling the scraper 210 to the respective paddle 100.

Figure 6:
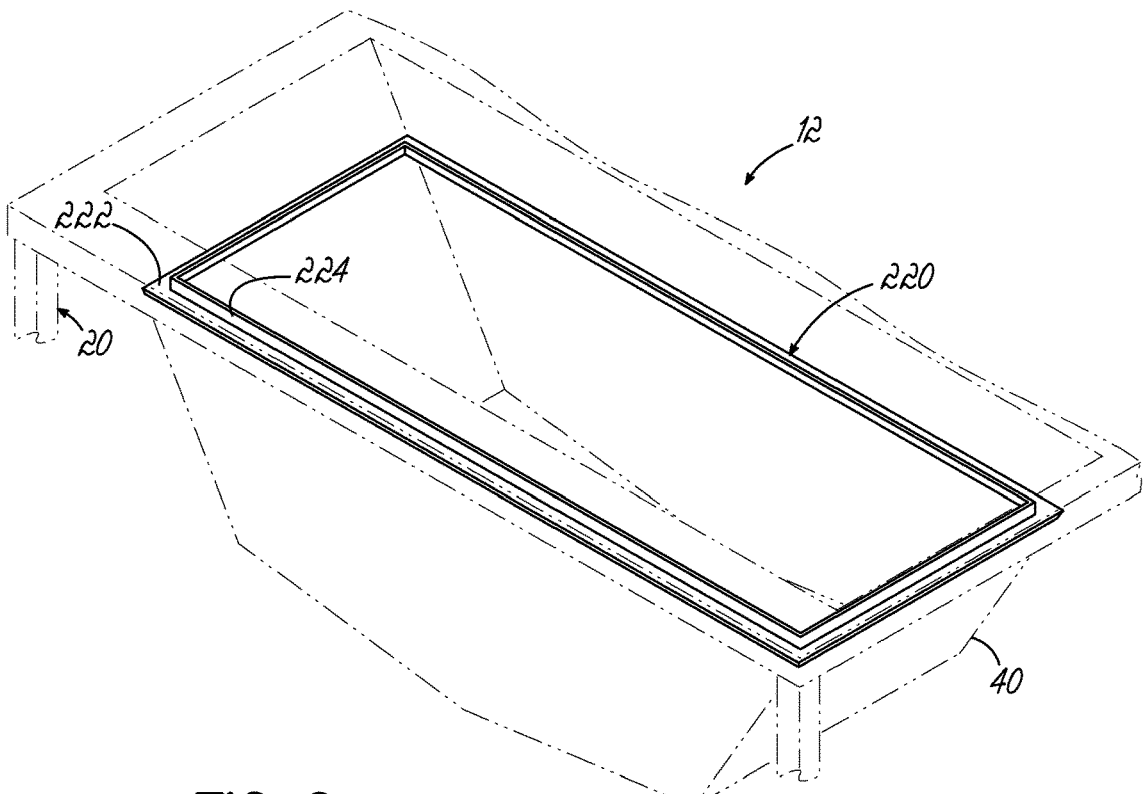
FIG. 6 is a partial view of the fryer shown in FIG. 1, showing the inclusion of a crumb gutter in accordance with an embodiment of the invention.

Referring now to FIG. 6, a crumb gutter 220 may be incorporated into the fryer 12 for collecting crumbs 206 and/or other debris at or near the inner periphery of the oil vat 40. In the embodiment shown, the crumb gutter 220 extends along the perimeter of the oil vat 40 and includes a generally horizontal portion 222 and a generally vertical portion 224 such that the crumb gutter 220 has a generally L-shaped cross section. Oil-borne crumbs 206 may settle on the horizontal portion 222, where they may be trapped on either side by the vertical portion 224 and the wall of the oil vat 40. In one embodiment, the circulation of the oil 41 may be configured to direct oil-borne crumbs 206 into the crumb gutter 220. For example, the circulation of the oil 41 may direct such crumbs 206 generally upwardly and/or generally outwardly, i.e. toward the periphery of the oil vat 40. In addition or alternatively, the crumb gutter 220 may be removable from the fryer 12 for disposal of the crumbs 206 contained therein.

Figure 7:
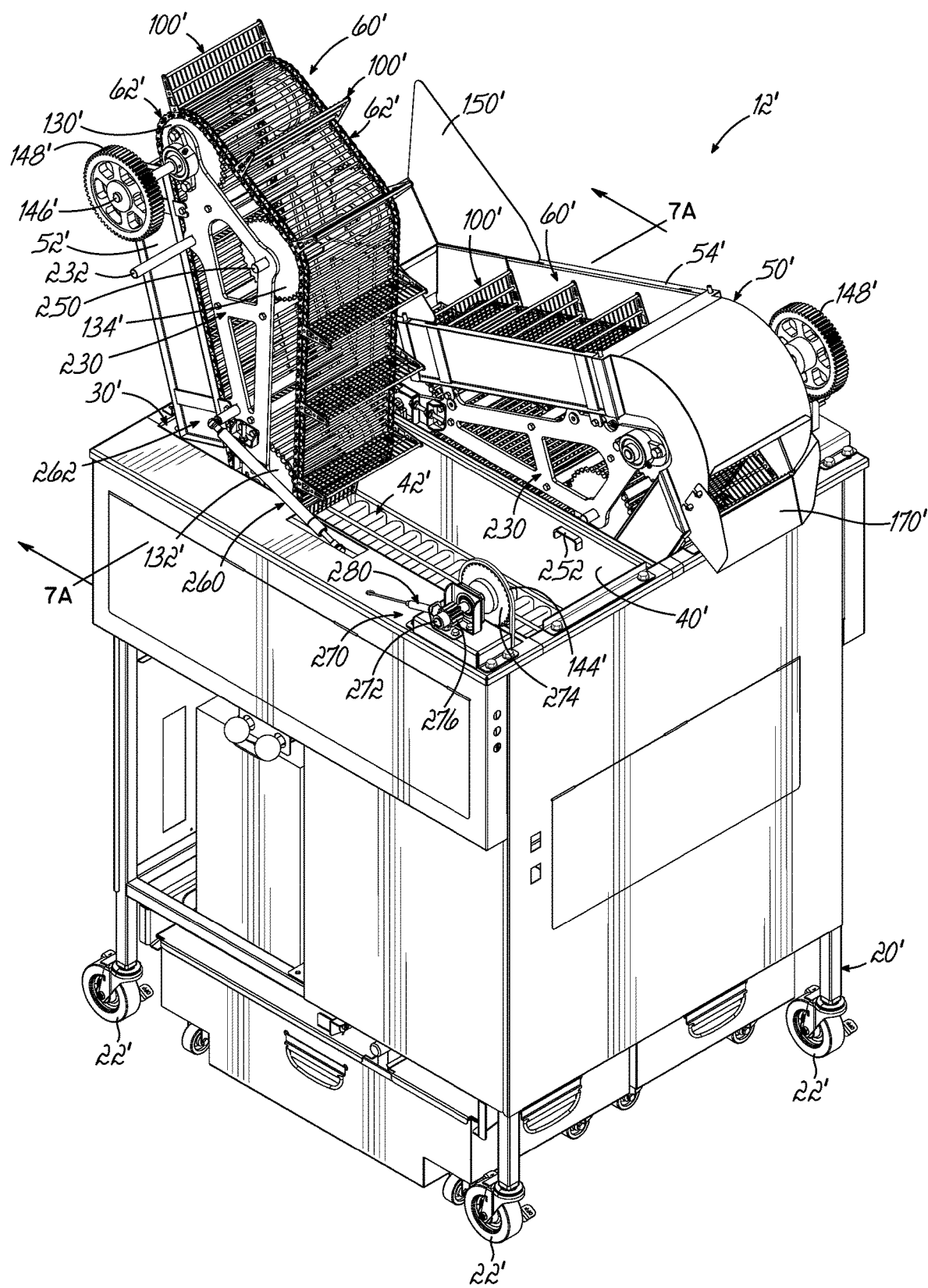
FIG. 7 is a perspective view of an exemplary fryer in accordance with another embodiment of the invention.
Figure 8A:
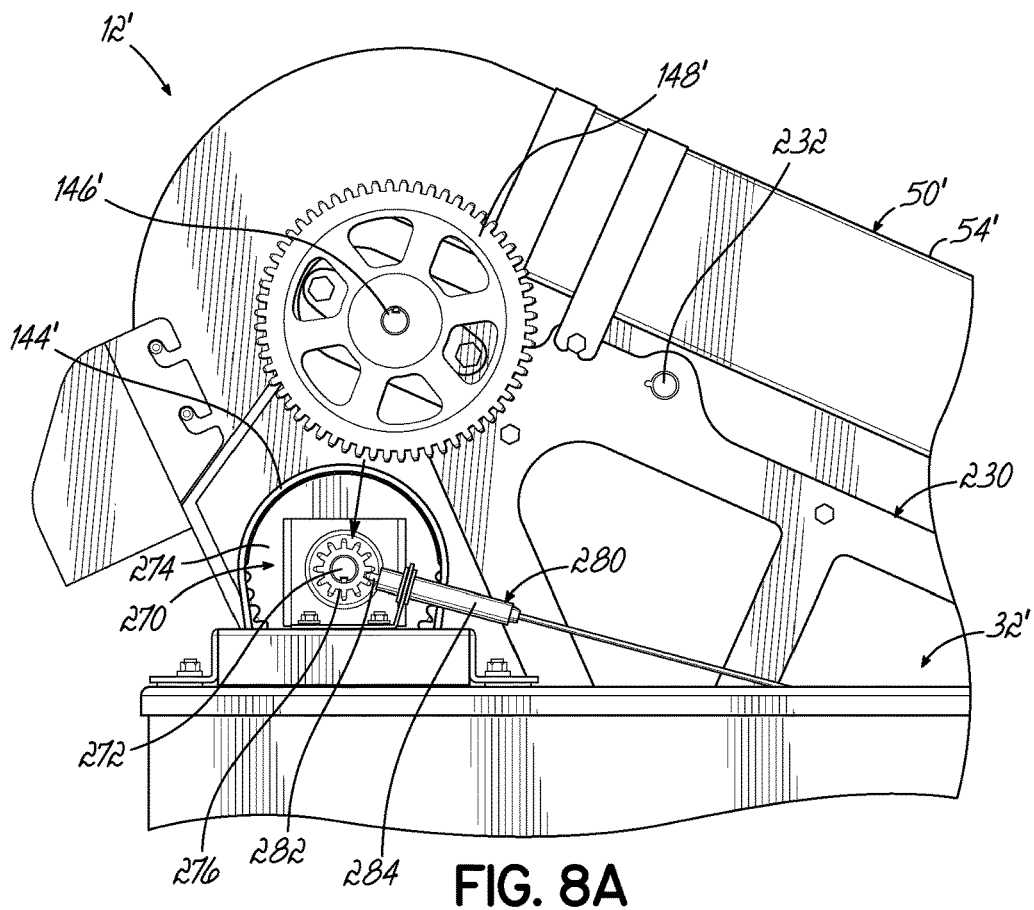
FIG. 8A is a partial side view of the fryer shown in FIG. 7, showing the conveyor frame pivoting toward the down position.
Figure 8B:
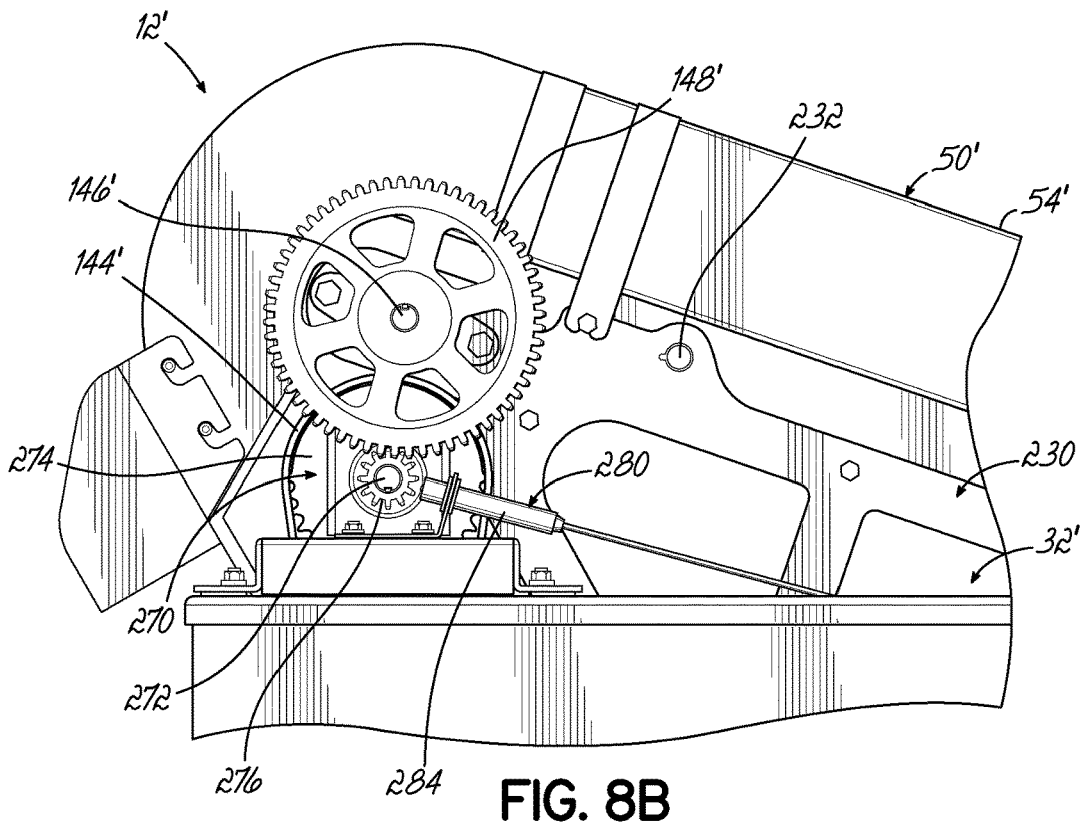
FIG. 8B is a partial side view similar to FIG. 8A, showing the conveyor frame in the down position.

With reference now to FIGS. 7-8B, wherein like numerals represent like features, an automated cooking apparatus such as a fryer 12' is shown in accordance with another embodiment. In the embodiment shown, each of the fryer stations 30', 32' is equipped with a conveyor belt 60' and associated components such that frying operations may be performed in each of the fryer stations 30', 32'. As shown, the conveyor belt 60' of each fryer station 30', 32' is independently pivotable between a generally horizontal "down" position and a generally vertical "up" position. When in the down position, the conveyor belt 60' may be used to perform cooking operations as discussed above with respect to FIGS. 1-3. When in the up position, the conveyor belt 60' may allow access to the oil vat 40', such as for cleaning or maintenance operations. Thus, the user is not required to completely remove and/or disassemble the conveyor belt 60' in order to access the oil vat 40' and then reinsert and/or reassemble the conveyor belt 60' after accessing the oil vat 40', which may be cumbersome and time consuming and may involve resetting the alignment of the conveyor belt 60' and/or associated components.

Figure 7A:
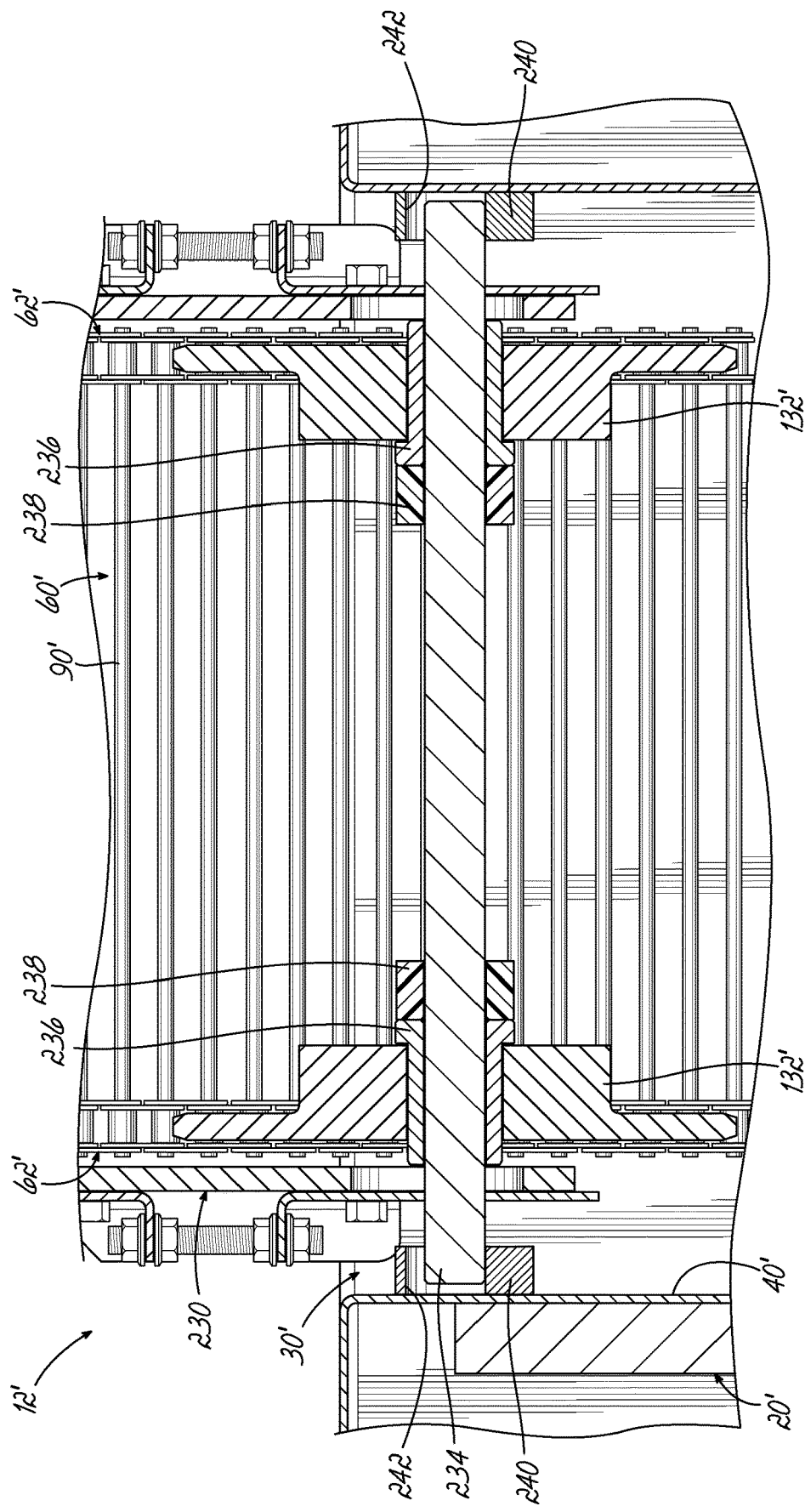
FIG. 7A is a cross sectional view of the fryer shown in FIG. 7, taken along section line 7A-7A.

In the embodiment shown, the driven belt sprocket gears 130' and first and second idler sprocket gears 132', 134' of each conveyor belt 60' are rotatably mounted on a generally triangular rigid conveyor frame 230. As shown, the conveyor frame 230 includes an elongate handle 232 for manipulating the orientation of the conveyor frame 230 relative to the oil vat 40'. In this regard, and as best shown in FIG. 7A, the first idler sprocket gears 132' of each conveyor belt 60' are rotatably mounted on an elongate rod 234 of the conveyor frame 230, such as via bushings 236. Axial movement of the bushings along the rod 234 may be restricted by stoppers 238, for example. In any event, the rod 234 is carried at both ends by a pair of oppositely disposed yokes 240 coupled to the oil vat 40'. To that end, each yoke 240 includes a cavity 242 for rotatably receiving a respective end of the rod 234. In this manner, the interaction between the ends of the rod 234 and the cavities 242 of the yokes 240 may allow the conveyor frame 230, and thus the conveyor belt 60', to be pivoted with respect to the oil vat 40' about an axis defined at least in part by the rod 234. For example, when a generally downward and/or rightward force is applied to the handle 232 of the conveyor frame 230 in the up position as shown in the foreground of FIG. 7, the conveyor frame 230 may be pivoted generally clockwise about the rod 234 toward the down position. Conversely, when a generally upward and/or leftward force is applied to the handle 232 of the conveyor frame 230 in the down position, the conveyor frame 230 may be pivoted generally counterclockwise about the rod 234 toward the up position. In the embodiment shown, each of the two conveyor belts 60' is provided with a dedicated conveyor frame 230 such that the conveyor belts 60' are independently pivotable. Alternatively, the conveyor belts 60' may share a single conveyor frame (e.g., by rigidly coupling the illustrated conveyor frames 230) such that the conveyor belts 60' may be pivotable together as a single unit.

Referring again to FIG. 7, the conveyor frame 230 includes a pair of oppositely disposed bumpers 250 (one shown) extending outwardly therefrom generally coaxially with the second idler sprocket gears 134'. A pair of oppositely disposed bumper rests 252 (one shown) extend inwardly from the oil vat 40' for mechanically engaging the respective bumpers 250 when the conveyor frame 230 is pivoted toward the down position to thereby prevent further pivoting of the conveyor frame 230 beyond the down position. In this manner, the mechanical engagement between the bumpers 250 and the bumper rests 252 may at least partially define the down position of the conveyor belt 60'. While not shown, bumpers and/or bumper rests generally similar to the bumpers 250 and bumper rests 252 may be provided at other locations on the conveyor frame 230 and/or oil vat 40' to at least partially define the up position of the conveyor belt 60', for example.

In the embodiment shown, a damper such as a gas shock 260 is positioned between and coupled to the conveyor frame 230 and the frame 20' (and/or oil vat 40') of the fryer 12' in order to provide lift assistance when pivoting the conveyor belt 60' between the up and down positions. As shown, the gas shock 260 may be coupled to the conveyor frame 230 via a ball and socket joint 262 such that the orientation of the conveyor frame 230 relative to the gas shock 260 may vary during pivoting of the conveyor belt 60' between the up and down positions such that the gas shock 260 may avoid interfering with such pivoting. In one embodiment, expansion of the gas shock 260 may be limited to a predefined fully expanded position. For example, when the conveyor frame 230 is pivoted toward the up position, the gas shock 260 may expand to its fully expanded position to thereby prevent further pivoting of the conveyor frame 230 beyond the up position. In this manner, the fully expanded position of the gas shock 260 may at least partially define the up position of the conveyor belt 60'. In one embodiment, the gas shock 260 may also provide resistance when pivoting the conveyor frame 230 toward the down position in order to avoid overly rapid movement such as dropping or slamming of the conveyor frame 230 that could damage the components of the conveyor belt 60' and/or fryer 12'.

As shown, a clutch system 270 is provided between the motor (not shown) and the driven shaft 146' to operatively engage and disengage the motor and the driven shaft 146' for accommodating pivoting of the conveyor belt 60' between the up and down positions. In this regard, the belt drive chain 144' is operatively coupled to a drive shaft 272. To that end, the drive shaft 272 is coupled to a drive shaft sprocket gear 274 at or near one end of the drive shaft 272 and is coupled to a drive shaft pinion gear 276 at or near an opposite end of the drive shaft 272. The drive shaft sprocket gear 274 engages with the belt drive chain 144' to transmit the motion from the motor and/or motor sprocket gear (not shown) to the drive shaft 272 and thereby to the drive shaft pinion gear 276. When the conveyor belt 60' is in the down position, the drive shaft pinion gear 276 may engage with the driven shaft sprocket gear 148' to transmit the motion to the driven shaft 146' and the driven belt sprocket gears 130' to drive the conveyor belt 60' in a manner similar to that discussed above with respect to FIGS. 1-3.

With specific reference to FIGS. 8A and 8B, the driven shaft sprocket gear 148' may be freely engageable with and/or freely disengageable from the drive shaft pinion gear 276. More particularly, the driven shaft sprocket gear 148' may automatically engage with the drive shaft pinion gear 276 when the conveyor belt 60' is in the down position, and may automatically disengage therefrom when the conveyor belt 60' is pivoted toward the up position. Thus, the operative coupling between the motor and the driven shaft 146' may be automatically engaged and/or disengaged as the conveyor belt 60' is pivoted between the up and down positions. In this regard, there is no need to position a belt and/or chain over the driven shaft sprocket gear 148' in order to operatively engage the motor and the driven shaft 146' and there is no need to remove such a belt and/or chain in order to operatively disengage the motor and the driven shaft 146'. Thus, pivoting of the conveyor belt 60' between the up and down positions may be performed quickly and efficiently.

As shown, the clutch system 270 may include a brake 280 for preventing rotation of the drive shaft pinion gear 276. The illustrated brake 280 includes a tooth 282 expandable from and retractable into a cylinder or sleeve 284. When it is desired to pivot the conveyor belt 60' toward the up position, such as for performing a cleaning or maintenance operation, the motor may be deactivated and the tooth 282 may be expanded from the sleeve 284 to engage a pair of teeth of the drive shaft pinion gear 276 and thereby prevent rotation of the drive shaft pinion gear 276. The conveyor belt 60' may then be pivoted toward the up position such that the driven shaft sprocket gear 148' disengages the drive shaft pinion gear 276, and the cleaning or maintenance operation may be performed with the conveyor belt 60' in the up position. When it is desired to return the conveyor belt 60' to the down position, such as for performing a cooking operation, the conveyor belt 60' may be pivoted toward the down position (FIG. 8A). By maintaining the engagement of the tooth 282 of the brake 280 with the teeth of the drive shaft pinion gear 276 to keep the drive shaft pinion gear 276 locked against rotation, the alignment of the driven shaft sprocket gear 148' with the drive shaft pinion gear 276 as the driven shaft sprocket gear 148' reengages the drive shaft pinion gear 276 may be substantially the same as that when the driven shaft sprocket gear 148' previously disengaged the drive shaft pinion gear 276. In this manner, the driven shaft sprocket gear 148' may smoothly reengage the drive shaft pinion gear 276 without requiring the user to manually realign the driven shaft sprocket gear 148' with the drive shaft pinion gear 276. Thus, the brake 280 may enable relatively quick and efficient operative reengagement of the motor to the driven shaft 146' while avoiding damage to the driven shaft sprocket gear 148' and the drive shaft pinion gear 276. After reengagement of the driven shaft sprocket gear 148' and the drive shaft pinion gear 276, the tooth 282 may be retracted into the sleeve 284 to allow rotation of the drive shaft pinion gear 276 for performing cooking operations. Various other aspects of the fryer 12' are similar to those previously described with respect to the fryer 12, and are not repeated for the sake of brevity.

In general, the routines executed by the controller 200 to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A fryer comprising:
   a cooking chamber for holding a cooking medium;
   at least one heating element positioned within the cooking chamber; and
   a conveyor belt for selectively advancing a food product through the cooking chamber, wherein the conveyor belt defines a continuous loop, the conveyor belt further comprising:
   a plurality of compartments being sized to receive at least a portion of the food product;
   a chain ladder defined by a plurality of elongate members extending between a first chain and a second chain, the elongate members spaced apart from each other to allow passage of the cooking medium therebetween while inhibiting passage of the food product, wherein several of the plurality of elongate members in the chain ladder define a base to each of the plurality of compartments; and
   a plurality of paddles coupled to and extending between the first and second chains, each of the plurality of paddles including a screen extending transversely from the chain ladder to divide adjacent ones of the plurality of compartments from one another,
   wherein each of the plurality of paddles further comprises a first bracket coupled to the first chain and a second bracket coupled to the second chain, and the screen of each of the plurality of paddles is defined by a plurality of elongate members extending between the first and second brackets and a plurality of elongate cross members extending transversely across the plurality of elongate members to collectively allow passage of the cooking medium therebetween while inhibiting passage of the food product, each paddle thereby defining a compartment sidewall that is a front sidewall of one of the plurality of compartments and also a rear sidewall of another, adjacent one of the plurality of compartments,
   wherein the conveyor belt is mounted on a conveyor frame that is pivotable with respect to the cooking chamber between an up position and a down position.

2. The fryer of claim 1, further comprising at least one driven gear for engaging at least one of the first and second chains such that rotation of the at least one driven gear causes movement of the conveyor belt.

3. The fryer of claim 1, further comprising a track positioned between the at least one heating element and the conveyor belt.

4. The fryer of claim 1, further comprising a crumb trap for capturing crumbs, wherein the cooking chamber includes an aperture for allowing the crumbs to pass into the crumb trap.

5. The fryer of claim 1, further comprising at least one scraper coupled to at least one of the plurality of paddles.

6. The fryer of claim 1, further comprising a crumb gutter extending along an inner periphery of the cooking chamber.

7. The fryer of claim 1, further comprising:
   at least one driven gear for engaging at least one of the first and second chains such that rotation of the at least one driven gear causes movement of the conveyor belt; and
   a motor for transmitting power to the at least one driven gear, wherein the motor operatively engages the at least one driven gear when the conveyor frame is in the down position and wherein the motor operatively disengages the at least one driven gear when the conveyor frame is pivoted from the down position toward the up position.

8. The fryer of claim 7, further comprising:
   a driven shaft sprocket gear operatively coupled to the at least one driven gear;
   a drive shaft pinion gear operatively coupled to the motor and configured to engage the driven shaft sprocket gear when the conveyor frame is in the down position; and
   a brake for preventing rotation of the drive shaft pinion gear when the conveyor frame is in the up position.

9. The fryer of claim 1, further comprising a gas shock positioned between the conveyor belt and the cooking chamber for assisting pivoting of the conveyor frame.

10. The fryer of claim 1, wherein each of the plurality of elongate members in the chain ladder and in the screens as well as each of the plurality of elongate cross members in the screens is defined by a generally cylindrical elongate rod.

11. An automated cooking system comprising:
    a freezer including a dispensing mechanism for dispensing a food product;
    a fryer including:
       a cooking chamber for holding a cooking medium;
       at least one heating element positioned within the cooking chamber; and
       a conveyor belt for selectively advancing the food product through the cooking chamber, wherein the conveyor belt defines a continuous loop, the conveyor belt further comprising:
       a plurality of compartments being sized to receive at least a portion of the food product dispensed from the dispensing mechanism;
       a chain ladder defined by a plurality of elongate members extending between a first chain and a second chain, the elongate members spaced apart from each other to allow passage of the cooking medium therebetween while inhibiting passage of the food product, wherein several of the plurality of elongate members in the chain ladder define a base to each of the plurality of compartments; and
       a plurality of paddles coupled to and extending between the first and second chains each of the plurality of paddles including a screen extending transversely from the chain ladder to divide adjacent ones of the plurality of compartments from one another,
       wherein each of the plurality of paddles further comprises a first bracket coupled to the first chain and a second bracket coupled to the second chain, and the screen of each of the plurality of paddles is defined by a plurality of elongate members extending between the first and second brackets and a plurality of elongate cross members extending transversely across the plurality of elongate members to collectively allow passage of the cooking medium therebetween while inhibiting passage of the food product, each paddle thereby defining a compartment sidewall that is a front sidewall of one of the plurality of compartments and also a rear sidewall of another, adjacent one of the plurality of compartments, and
    a hopper for receiving food product from the conveyor belt,
    wherein the conveyor belt is mounted on a conveyor frame that is pivotable with respect to the cooking chamber between an up position and a down position.

12. The automated cooking system of claim 11, further comprising:
 a motor for driving movement of the conveyor belt; and
 a controller operatively coupled to the motor.

13. The automated cooking system of claim 12, wherein the controller is operatively coupled to the dispensing mechanism of the freezer.

14. The automated cooking system of claim 13, wherein the controller is configured to implement at least one of a continuous mode or a batch mode.

15. The automated cooking system of claim 11, wherein the fryer further includes:
 at least one driven gear for engaging at least one of the first and second chains such that rotation of the at least one driven gear causes movement of the conveyor belt; and
 a motor for transmitting power to the at least one driven gear, wherein the motor operatively engages the at least one driven gear when the conveyor frame is in the down position and wherein the motor operatively disengages the at least one driven gear when the conveyor frame is pivoted from the down position toward the up position.

16. The automated cooking system of claim 15, wherein the fryer further includes:
 a driven shaft sprocket gear operatively coupled to the at least one driven gear;
 a drive shaft pinion gear operatively coupled to the motor and configured to engage the driven shaft sprocket gear when the conveyor frame is in the down position; and
 a brake for preventing rotation of the drive shaft pinion gear when the conveyor frame is in the up position.

17. The automated cooking system of claim 11, wherein the fryer further includes a gas shock positioned between the conveyor belt and the cooking chamber for assisting pivoting of the conveyor frame.

\* \* \* \* \*